UNITED STATES PATENT OFFICE.

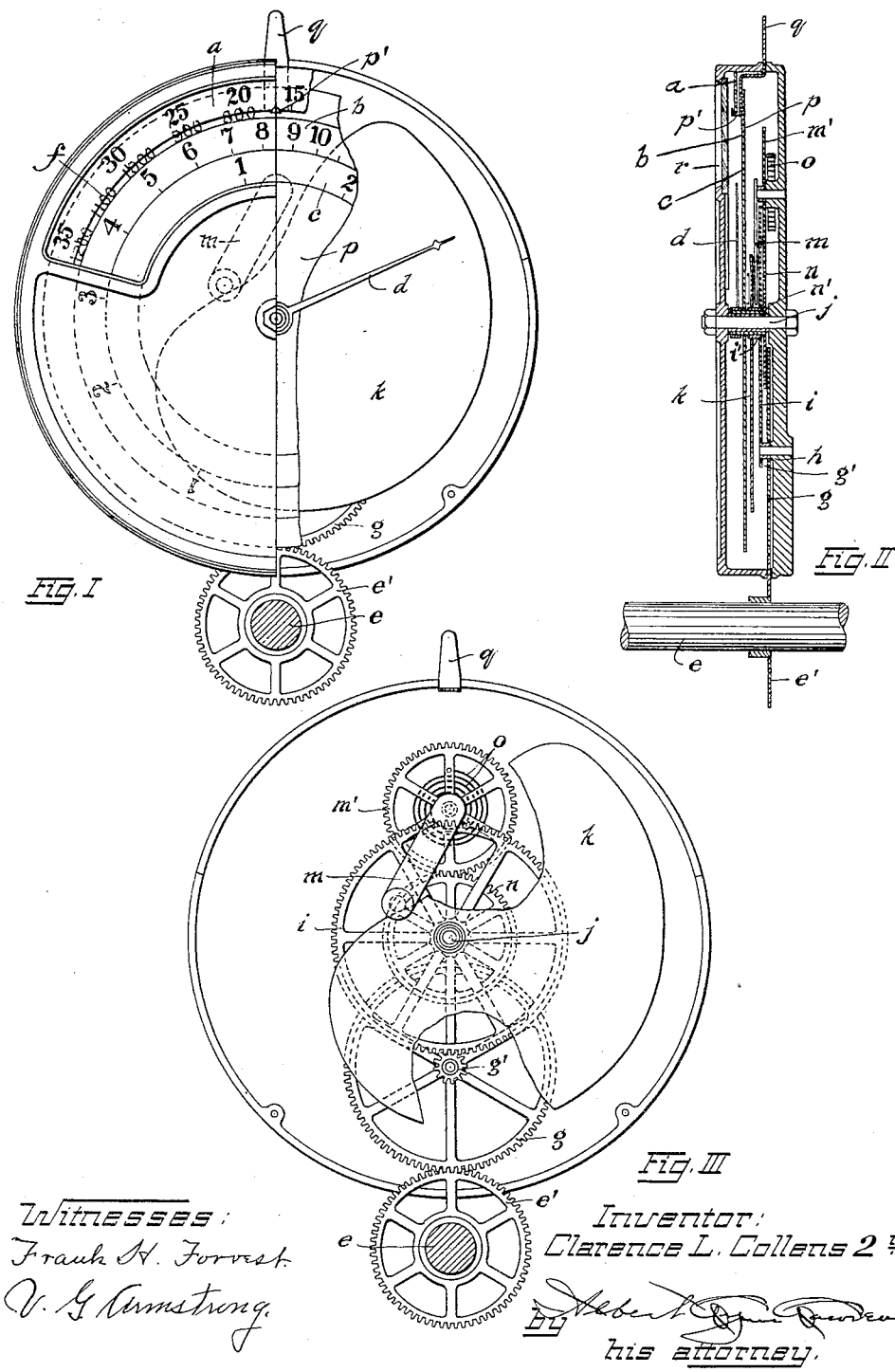

CLARENCE L. COLLENS, 2D, OF CLEVELAND, OHIO, ASSIGNOR TO THE RELIANCE ELECTRIC & ENGINEERING COMPANY, OF CLEVELAND, OHIO, A CORPORATION OF OHIO.

SPEED GAGING AND INDICATING MECHANISM.

1,123,849.     Specification of Letters Patent.     Patented Jan. 5, 1915.

Application filed July 29, 1909. Serial No. 510,230.

*To all whom it may concern:*

Be it known that I, CLARENCE L. COLLENS, 2d, a citizen of the United States of America, and a resident of Cleveland, in the county of Cuyahoga and State of Ohio, have invented certain new and useful Improvements in Speed Gaging and Indicating Mechanism, of which the following is a specification.

My invention relates to improvements in speed gaging and indicating mechanism, and has for its object the provision of means whereby a plurality of variable values may be simply and readily computed for the purpose of determining the proper speed for cutting tools, machine tools and the like.

The object of my invention is to permit the workmen operating such tools, without the necessity for calculating these variables, to so adjust the driving means, as to conform to the requisite conditions for any particular piece of work.

Hitherto, it has been practicable to determine quickly with the automatic means at hand, but a single variable, but in my improved construction I have provided for the automatic computation of a plurality of variable quantities in the mechanism shown, and specifically described.

In said apparatus, there are provided a plurality of calculated adjustable scales, so associated with the driving means, as to determine the consequent of several variable factors, which for a lathe, may comprise the speed of the driving mechanism or motor, the speed at the point of the cutting tool, and the diameter of the part turned, either with or without the back gear of the lathe thrown in. My said improvements, however, are applicable to a large and varying class of mechanism, such as machine tools, shapers, boring machines and the like, but will be here explained as applied to lathes, making reference to the accompanying sheet of drawings, wherein:—

Figure I is a face view partially broken away of a speed gage and indicating device, constructed in accordance with my invention. Fig. II is a vertical sectional view through the same; and Fig. III is a plan view partially broken away, which further shows the actuating gear for said apparatus.

Throughout the several figures of the drawings, I have employed the same character of reference to indicate similar parts.

As shown by Fig. I, the present mechanism comprises a plurality of relatively adjustable scales, and a suitable indicator or pointer conforming to the actual speed of the driving mechanism or motor.

The outer scale $a$ is stationary, and is marked with figures indicating the cutting speeds at the tool, in feet per minute. The radial lines marking the different divisions on this scale, are laid out and calibrated so that the angular distance, measured in degrees, of each line from the radial line representing the zero of the scale, is equal to the logarithm of the cutting speed in feet per minute, multiplied by some constant chosen as the unit of angular measurement. The two inner scales $b$, $c$, provided on the disk $p$, are adjustable with respect to scale $a$, and are calibrated in the same unit of angular measurement, so that the different divisions represent logarithmic values, corresponding with the varying sizes of the work. In the case assumed herein for explanation of my invention, the figures marked on the scale, are the diameters in inches, of the parts to be machined, and the divisions are laid off so as to correspond with the logarithmic values of these numbers.

The scale $b$ is for use if the back gear is in, and the scale $c$, if the back gear is out, the angular displacement between the two representing, in the units of measurement chosen, the logarithm of the quotient obtained by dividing the ratio of one method of drive by the ratio of the other. If there were more than two gear-combinations between the driving motor and the lathe spindle, additional scales would be supplied, one for each gear change, their relative angular displacement being definitely fixed by the speed variation afforded by each change. The speed-indicating pointer $d$, is connected with, and governed by the speed controlling or controlled part, as by the shaft $e$, and the readings may be taken from the adjustable scales *b* or *c*, or the actual speed of the motor in revolutions per minute, may be read upon the scale *f* ground in the glass of the dial.

The shaft *e* may be actuated by any suitable means, such as a centrifugal governor, or a controlling rheostat, connected therewith, or said shaft may itself comprise a part of the speed-controlling means for an electric motor; the sole requirement being that as the speed of the driving mechanism is changed by whatever means, the pointer *d* is rotated by cam *k* through angles representing in the units of measurement chosen, the logarithms of the changing speed of rotation of the driving mechanism; or that the shaft is suitably actuated in any manner proportionately to the logarithms of the speed at which the motor device is being driven. Preferably, for the purposes in hand, an electric motor of the variable speed type, best lends itself to the individual control of such tools as my improvement is directly applicable to.

It will be understood that the scales *a*, *b*, *c* and *f*, or other corresponding appropriate scales, are calculated, and adjusted in position relatively with respect to each other, for the particular purpose or machine with which the speed gage is to be used, and the cam and gearing, hereinafter described, necessarily must correspond thereto. Assuming, however, a variable speed electric motor as the power, and a lathe driven thereby as the machine with which my improvement is employed, and shaft *e* as part of the speed-controlling mechanism of said motor, it will be seen that the controlling shaft *e*, connected with the interior gearing of the device, must necessarily control the position of the pointer *d*. The gear wheel *e'* upon shaft *e*, meshes with a co-acting gear *g*, mounted upon the back frame *h* of the indicator, the small pinion *g'*, which rotates therewith meshing with the large gear wheel *i*, which has a sleeve connecting *i'* with the cam *k*; both of them being mounted to rotate upon the main shaft *j*. This cam *k* is calculated and its shape is such as to cause the associated arm *m* bearing upon its edge, and in consequence the pointer *d*, connected thereto by means of the gears *m' n*, to assume the logarithmic angle corresponding directly to the speed of the motor. A light helical spring *o* causes the arm *m* to bear against the edge of the cam *k*, the shape of which is shown in dotted and full lines, Fig. I, but the same is broken away in Fig. III, better to illustrate the associated gearing. The pointer *d* and gear *n*, are both mounted upon the rotatable sleeve *n'* on the main shaft *j*. Likewise, the disk *p* is adjustably mounted upon shaft *j*; being rotatable thereon by means of the finger piece *q*, while the indicator *p'* thereon, extends beneath and in front of the lower edge of scale *a*.

It will now be appreciated how the apparatus of my invention may be employed for the gaging or calculation of speeds. Indicator *p'* and the scales *b c* being movable together, the cutting speed at the tool will first be indicated on scale *a* by actuating the finger piece *q*. Thus, in Fig. I, the cutting speed is set for 16 feet per minute, and consequently the scales *b c* indicative of the diameter of the part to be turned, are in proper reading position within the glass covered opening *r*, for securing the adjustment of the speed to conform to various diameters. If the back gear is thrown in, the respective diameters for the indicated speed range will be indicated upon the outer scale *b*, while if the single gear is in use, the reading will be upon the inner scale *c*; the ratio of assumed speeds being substantially 7 to 1. Assuming further that the part to be turned is 6 inches in diameter, the motor will be speeded up until the indicator *d* points to figure 6 on scale *b*; the relation of the two scales indicating immediately to the workmen whether or not the back gear should be used for the desired speed, since their diameter does not appear upon scale *c*. Under these conditions of adjustment therefore, the requisite speed of 16 feet per minute at the cutting tool, will be maintained upon the part turned of 6 inches in diameter, when the pointer *d* is advanced to indicate figure 6 on scale *b*. On the other hand, if the cutting speed should be higher, as for example 25 feet per minute, the scales *b c* will be rotated toward the left, until the indicator *p'* is opposite figure 25 of scale *a*, whereupon the indicator or pointer *d* must be actuated through a greater arc to denote this cutting speed for the same diameter of the part turned. Thus, it will be seen that the adjustments may be readily varied by an unskilled workman to conform to any desired working conditions, without resorting to any calculation, or leaving any factor to judgment or uncertainty.

If desired, the speed of the motor in revolutions per minute may be read upon the scale *f*; ranging in the case assumed up to a speed somewhat higher than 1200 revolutions per minute. This scale, as stated, may be upon the glass covering the opening *r*, if desired.

As a concrete example of the calculation for the cam, I may refer to the following formulæ: In a lathe, the relation between the different variables affecting the cutting speed at the tool, is given by the following equation, in which $x$ equals the speed in revolutions per minute of the driving mechanism, assumed to be a motor, $r$ equals the ratio of the drive between the lathe spindle and the motor, that is the quotient obtained by dividing the revolutions per minute of the shaft of the motor by the revolutions per minute of the spindle, $y$ equals the cutting speed at the tool in feet per minute and $z$ the diameter in inches of the part machined:

$$y = \frac{3.14z}{12} \cdot \frac{x}{r} \quad (1)$$

$$x = 3.82 \cdot r \cdot \frac{y}{z} \quad (2)$$

From this equation it is evident that, if the logarithms of the different factors in this equation are represented by angles, choosing any angle as the unit of measurement, the angle corresponding with the log $x$ must equal the net sum of the angles representing the values:

$$\log. 3.82 + \log. r + \log. y = \log. z \quad (3)$$

In the precise case assumed for explaining my improvements, it may be pointed out in conclusion, that the computations necessary require multiplication and division for ascertaining the consequent or actual speed for driving the machine under given working conditions. The instrument herein disclosed, however, affords computed scales, which are relatively adjustable with respect to each other, and to an indicator or pointer, whereby mere additions or subtractions of the divisions on the scales, by the relative movement of the scales and indicator, accomplish such multiplications and divisions relating to the cutting speed at the tool, the diameter of the part turned either with or without the back gear, and the speed at which the electric motor is driven. By reason of the fact that the scales are computed to afford logarithmic divisions, and the indicator is actuated by means of the cam, also computed for logarithmic values, the instrument is adapted directly to effect the computations involving the multiplication and division of the assigned values.

In considering the specification and claims, it should be borne in mind that the obvious expedient may be adopted of employing mere reversal of parts, as is evidenced in various instruments of precision. Again, the computation of the cam and the various scales, of course, may be made in accordance with numerous mathematical formulæ, which need not be disclosed herein, for adapting the instrument to widely different employments, and the calculation of different values.

Having now explained the features of construction and mode of operation of an indicating mechanism, constructed in accordance with my invention, I claim as new, together with such modifications as may be made by mere skill, the following:—

1. In an instrument of the class described, the combination with a member adjustable to conform to the speed of a driving mechanism, of an indicator, mechanism for moving said indicator from said member, including a cam calculated to actuate the same through predetermined divisions, and a scale-member whereon the readings of said indicator may be made, substantially as set forth.

2. In an instrument of the class described, the combination with a member adjustable to conform to the speed of a driving mechanism, of an indicator, suitable connecting means between said member and indicator whereby the latter is adapted to be actuated, and a scale-member relatively adjustable with respect to said indicator whereby the desired operative speed under different conditions may be gaged, substantially as set forth.

3. In an instrument of the class described, the combination with a member adjustable to conform to the speed of a driving mechanism, of a calculated cam-part, mechanism connecting the same to be actuated by said driving mechanism, an indicator controlled by said cam-part, a scale-member whereon the indicator-readings may be made, and means for adjusting the relative positions of the scale-member and indicator, whereby the desired operative speed under different conditions may be gaged, substantially as set forth.

4. In apparatus of the class described, the combination with a member adjustable to conform to the speed of the driving mechanism, of a calculated cam-part actuated thereby, suitable connecting means therefor, an indicator connected for movement by said cam-part, an adjustable scale-member therefor, a secondary indicator for the scale-member, and a secondary scale whereon readings of the secondary indicator may be made, substantially as set forth.

5. In an instrument of the class described, the combination with a member adapted to conform to the speed of the driving mechanism, of an indicator, means including a calculated cam-part connected to move said indicator through predetermined divisions, and a relatively adjustable scale-member therefor, whereon the readings of said indicator are adapted to be made, substantially as set forth.

6. In an instrument of the class described, the combination with an indicator and actuating-means governed by the speed of the motor-mechanism, of a stationary scale member designating various working speeds, a scale member movable relatively thereto and to the indicator designating the sizes of different parts to be worked, and a second indicator movable with the scale member and having its readings along the first mentioned scale, substantially as set forth.

7. In a speed gaging and indicating mechanism, the combination with a member adjustable to conform to the speed of the associated motor-mechanism, of a calculated cam geared to be rotated thereby, intermediate gearing a hand or indicator connected to be actuated by the cam, suitable connecting means, a movable scale member whereon the readings of the indicator are made, a secondary scale coöperating with the indicator, and a secondary indicator whose readings are made upon the secondary scale, substantially as set forth.

Executed at Cleveland, Ohio, this 27th day of July, A. D. 1909, in the presence of two subscribing witnesses.

CLARENCE L. COLLENS, 2D.

Witnesses:
FRANK H. FORREST,
ALBERT LYNN LAWRENCE.

Copies of this patent may be obtained for five cents each, by addressing the "Commissioner of Patents, Washington, D. C."